US011448449B2

(12) United States Patent
Drobnis et al.

(10) Patent No.: US 11,448,449 B2
(45) Date of Patent: Sep. 20, 2022

(54) MOBILE REFRESHMENT CART WITH THERMOELECTRIC COOLING

(71) Applicant: Universal City Studios LLC, Universal City, CA (US)

(72) Inventors: Nick Drobnis, Orlando, FL (US); Darryl Gibson, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 514 days.

(21) Appl. No.: 16/253,094

(22) Filed: Jan. 21, 2019

(65) Prior Publication Data

US 2020/0141624 A1 May 7, 2020

Related U.S. Application Data

(60) Provisional application No. 62/756,985, filed on Nov. 7, 2018.

(51) Int. Cl.
*F25B 21/02* (2006.01)
*F25D 11/00* (2006.01)

(52) U.S. Cl.
CPC ............ *F25D 11/003* (2013.01); *F25B 21/02* (2013.01); *F25B 2321/023* (2013.01);
(Continued)

(58) Field of Classification Search
CPC .................. F25D 11/003; F25D 11/022; F25B 2321/0251; F25B 2321/025;
(Continued)

(56) References Cited

U.S. PATENT DOCUMENTS 2,943,452 A    7/1960  Buchanan
3,199,579 A    8/1965  Foster et al.
(Continued)

FOREIGN PATENT DOCUMENTS

CN       1837346 A     9/2006
CN     101283224 A    10/2008
(Continued)

OTHER PUBLICATIONS

PCT/US2019/059649 International Search Report and Written Opinion dated Mar. 23, 2020.
CN 201980073375.1 Office Action dated Mar. 21, 2022.

*Primary Examiner* — Brian M King
(74) *Attorney, Agent, or Firm* — Fletcher Yoder, P.C (57) ABSTRACT

A mobile refreshment cart includes an open refreshment chamber exposed to an environment surrounding the refreshment cart and configured to receive refreshment containers therein. The mobile refreshment cart also includes a thermally conductive plate having a first surface facing the open refreshment chamber, and having a second surface opposite to the first surface. The mobile refreshment cart also includes a thermoelectric cooler coupled to, and directly contacting, the second surface of the thermally conductive plate. The thermoelectric cooler is configured to extract heat from the thermally conductive plate through the second surface of the thermally conductive plate. The refreshment cart also includes a fan configured to urge an air flow over a portion of the thermoelectric cooler and to the environment, such that the air flow extracts the heat from the thermoelectric cooler and expels the heat to the environment.

22 Claims, 6 Drawing Sheets

(52) U.S. Cl.
CPC ............. *F25B 2321/0211* (2013.01); *F25B 2321/0212* (2013.01); *F25B 2321/0251* (2013.01)

(58) Field of Classification Search
CPC ........ F25B 2321/023; F25B 2321/0212; F25B 2321/0211
USPC .......................................................... 62/3.61
See application file for complete search history.

(56) References Cited

U.S. PATENT DOCUMENTS

| | | | |
|---|---|---|---|
| 3,255,812 A | 6/1966 | Bayane et al. | |
| 3,315,474 A | 4/1967 | Farer | |
| 3,733,836 A * | 5/1973 | Corini | F25B 21/02 |
| | | | 62/3.61 |
| 4,738,114 A | 4/1988 | Mullen | |
| 5,404,935 A | 4/1995 | Liebermann | |
| 6,173,575 B1 | 1/2001 | Hall et al. | |
| 6,409,186 B2 | 6/2002 | Bennington | |
| 6,560,968 B2 | 5/2003 | Ko | |
| 6,732,533 B1 * | 5/2004 | Giles | F25B 21/04 |
| | | | 62/244 |
| 7,159,404 B2 | 1/2007 | Vitantonio et al. | |
| 2006/0174634 A1* | 8/2006 | Hsu | F24F 5/0042 |
| | | | 62/3.3 |
| 2008/0016881 A1* | 1/2008 | Steffensen | F25B 21/04 |
| | | | 62/3.3 |
| 2008/0163628 A1* | 7/2008 | Lilke | F25B 21/02 |
| | | | 62/3.6 |
| 2009/0320516 A1* | 12/2009 | Kanagaki | A45F 3/04 |
| | | | 62/457.2 |
| 2011/0083446 A1* | 4/2011 | Pinet | F25B 21/02 |
| | | | 62/3.6 |
| 2011/0225981 A1 | 9/2011 | Glaros et al. | |
| 2012/0047911 A1 | 3/2012 | Bhavsar et al. | |
| 2015/0201749 A1 | 7/2015 | Turner et al. | |
| 2016/0363361 A1* | 12/2016 | Ohnishi | F25B 49/022 |
| 2017/0176096 A1* | 6/2017 | Lundberg | F25D 27/005 |
| 2020/0388740 A1* | 12/2020 | Toyoshima | H01L 35/30 |

FOREIGN PATENT DOCUMENTS

| | | |
|---|---|---|
| CN | 107344621 A | 11/2017 |
| EP | 3201541 | 8/2017 |
| JP | H05345544 A | 12/1993 |
| KR | 20120133287 | 12/2012 |
| KR | 20180097406 A | 8/2018 |
| RU | 2172452 | 8/2001 |

* cited by examiner

MOBILE REFRESHMENT CART WITH THERMOELECTRIC COOLING

CROSS-REFERENCE TO RELATED APPLICATION

This application claims priority to and the benefit of U.S. Provisional Application No. 62/756,985, entitled "MOBILE REFRESHMENT CART WITH THERMOELECTRIC COOLING," filed Nov. 7, 2018, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Refreshment carts may be used to store food and beverage items for transportation and/or sale in various entertainment venues, such as amusement parks. Certain traditional refreshment carts may include a traditional refrigerant cycle (e.g., utilizing a coolant) configured to cool the refreshments. Certain other traditional refreshment carts may not include a cooling apparatus, instead receiving ice in an insulated compartment in which the food or beverage items are stored.

Unfortunately, traditional refreshment carts such as those described above may be inefficient, wasteful, ineffective, or a combination thereof. Thus, it is presently recognized that improved refreshment carts are needed.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one aspect of the present disclosure, a mobile refreshment cart includes an open refreshment chamber exposed to an environment surrounding the refreshment cart and configured to receive refreshment containers therein. The mobile refreshment cart also includes a thermally conductive plate having a first surface facing the open refreshment chamber, and having a second surface opposite to the first surface. The mobile refreshment cart also includes a thermoelectric cooler coupled to, and directly contacting, the second surface of the thermally conductive plate. The thermoelectric cooler is configured to extract heat from the thermally conductive plate through the second surface of the thermally conductive plate. The refreshment cart also includes a fan configured to urge an air flow over a portion of the thermoelectric cooler and to the environment, such that the air flow extracts the heat from the thermoelectric cooler and expels the heat to the environment.

In accordance with another aspect of the present disclosure, a cooling assembly for a refreshment cart includes a container divided, by a container dividing wall of the container, into an upper container section and a lower container section. The cooling assembly also includes a thermally conductive plate disposed in the upper container section and separated from the container dividing wall by an air gap. A first surface of the thermally conductive plate faces a refreshment chamber of the cooling assembly disposed in the upper container section and configured to receive refreshment containers, and a second surface of the thermally conductive plate opposite to the first surface faces the air gap. The cooling assembly also includes a thermoelectric cooler traversing the lower container section and the upper container section by way of an opening in the container dividing wall. The thermoelectric cooler directly contacts the second surface of the thermally conductive plate and is configured to extract heat from the thermally conductive plate through the second surface.

In accordance with another aspect of the present disclosure, a mobile refreshment cart includes a refreshment chamber configured to receive refreshment containers. The mobile refreshment cart also includes a thermally conductive plate having a first surface facing, and partially defining, the refreshment chamber, and a second surface disposed opposite to the first surface. The mobile refreshment cart also includes a thermoelectric cooler coupled to the second surface of the thermally conductive plate and configured to extract heat through the second surface of the thermally conductive plate. The mobile refreshment cart also includes a fan configured to urge an air flow over a portion of the thermoelectric cooler and to an environment surrounding the mobile refreshment cart, such that the air flow extracts heat from the thermoelectric cooler and expels the heat to the environment.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Presently disclosed embodiments are directed toward refreshment carts, for example beverage carts. More particularly, presently disclosed embodiments are directed toward a mobile refreshment cart having thermoelectric cooling of a refreshment chamber thereof, for example an open or exposed refreshment chamber thereof, in which refreshments are disposed.

Refreshment carts may be used to store food and beverage items for transportation and/or sale in various entertainment venues, such as amusement parks, stadiums, arenas, theaters, boardwalks, etc. Certain traditional refreshment carts may include a traditional refrigerant cycle (e.g., utilizing a coolant) configured to cool the refreshments. Certain other traditional refreshment carts may not include an active cooling apparatus, instead receiving ice in an insulated compartment in which the food or beverage items are stored. Unfortunately, traditional refreshment carts such as those described above may be inefficient, wasteful, ineffective, or a combination thereof. For example, traditional refreshment carts which merely receive ice in an insulated cavity may include a lid over the cavity, thereby enclosing the cavity such that the ice does not melt. Closure of the insulated cavity obfuscates visibility of the beverages to potential customers, which may reduce sales.

Other traditional refreshment carts which receive ice in an insulated cavity may include an open top, thereby facilitating advertisement of the beverages. However, open-top refreshment carts which utilize ice in lieu of active cooling may be inefficient, since the ice is exposed to heat and may melt quickly. Other traditional refreshment carts may include an active refrigerant cycle, which may involve the use of expensive components and/or chemicals, such as a coolant. In general, traditional refreshment carts, which include but are not limited to those described above, may be inefficient, ineffective, wasteful, bulky, immobile, or any combination thereof.

In accordance with the present disclosure, a refreshment cart, such as a beverage cart, includes a cooling assembly having a container, where the container at least partially defines a refreshment chamber. The refreshment chamber is open or exposed to an environment surrounding the refreshment cart in a manner that facilitates advertisement, to potential customers, of the refreshments disposed and cooled in the refreshment chamber.

The cooling container may include a container dividing wall dividing the cooling container into two sections, for example an upper section and a lower section. In some embodiments, the cooling container dividing wall may be an extension of the structure of the mobile refreshment cart, as described in detail with respect to the drawings. In other embodiments, the container and/or container dividing wall may not be integrally formed with the structure of the mobile refreshment cart.

A thermally conductive plate, for example having an aluminum alloy material and a particular thickness suitable for the disclosed conductive heat transfer, may be disposed in the upper section of the cooling container, and may be separated from the container dividing wall by an air gap, which thermally decouples the container dividing wall from the thermally conductive plate. That is, the upper section of the cooling container may include the air gap above the cooling wall and below the thermally conductive plate, the thermally conductive plate, and the refreshment chamber above the thermally conductive plate. One or more thermoelectric coolers may traverse, or extend between, the upper section and the lower section of the cooling container. For example, the one or more thermoelectric coolers may extend from the lower section, through one or more openings in the container dividing wall, and into the upper section (e.g., the air gap of the upper section). Each of the thermoelectric coolers may include a Peltier device in certain embodiments, and may contact the thermally conductive plate. A power input to the thermoelectric cooler, for example a direct current provided by an inverter which receives an alternating current from an external power source, initiates the Peltier effect, causing the thermoelectric cooler to extract heat from the thermally conductive plate. Each thermoelectric cooler may be disposed in a corresponding "Venturi box," along with components which facilitate an air flow through the Venturi box, over a portion of the thermoelectric cooler (e.g., a heat sink of the thermoelectric cooler), and to environment. Thus, the air flow, which is facilitated by the Venturi box and associated components (e.g., fan components), may convey the heat extracted from the thermally conductive plate by the thermoelectric cooler to the environment.

Depending on the power input, the design or rating of the above-described components, and/or other features, the disclosed cooling assembly may generate a slab of ice above the thermally conductive plate and within the above-described refreshment chamber, and/or may otherwise cool the refreshment chamber to a temperature suitable for cooling beverages and other refreshments. Further, thermostats may monitor the temperature of various components and cause the inverter to modulate the power input to the one or more thermoelectric coolers, which facilitates precise temperature control of the refreshment chamber. These and other features are described in detail below with reference to the drawings.

Figure 1:
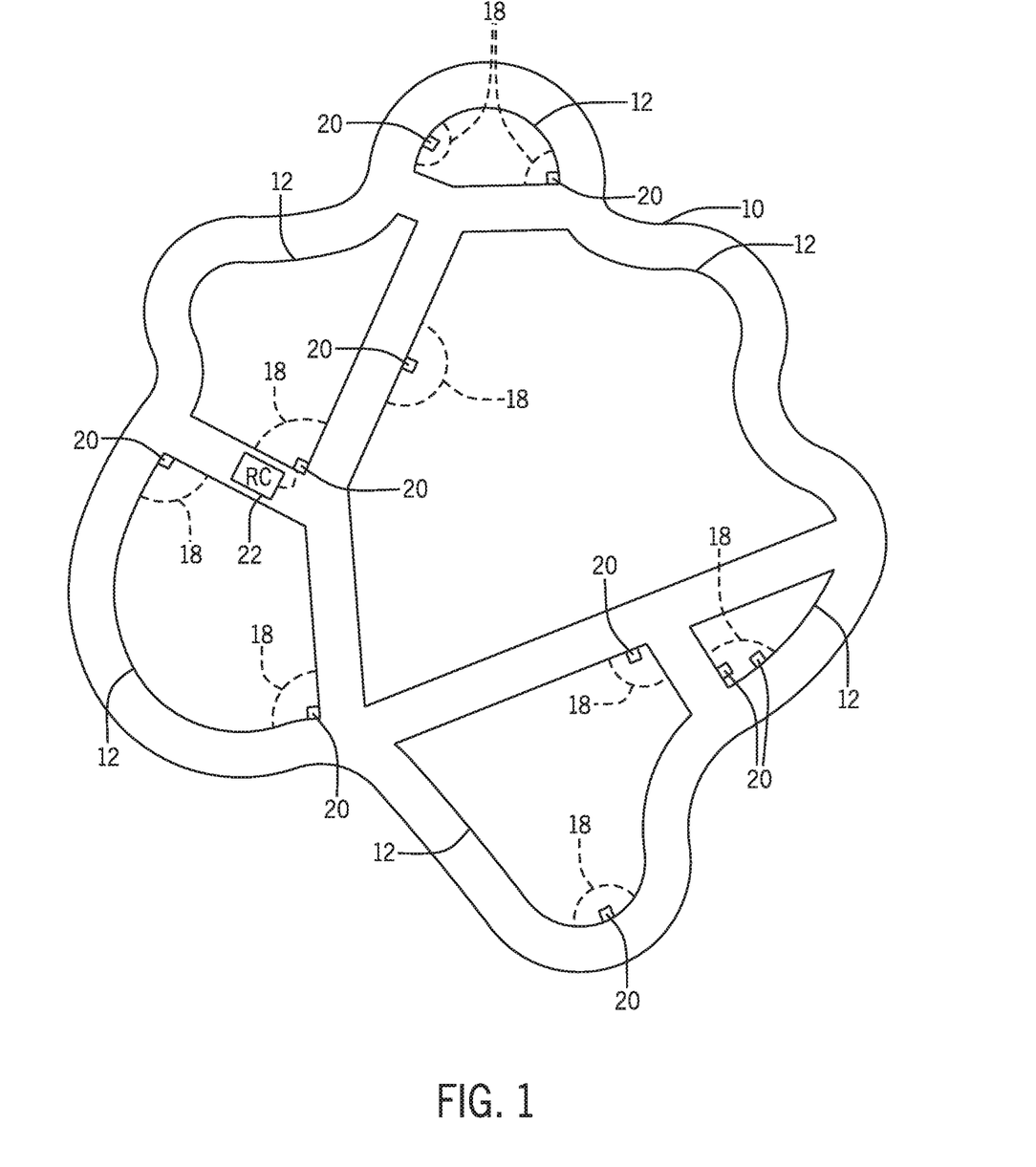
FIG. 1 is a schematic diagram of an embodiment of an amusement park having a mobile refreshment cart, in accordance with the present disclosure.

Turning now to the drawings, FIG. 1 is a schematic diagram illustrating an embodiment of an amusement park 10 having various attractions 12. The attractions 12 may include, for example, rides, roller coasters, shows, tours, dining establishments, and other attractions. Certain of the attractions 12 and/or surrounding areas may include regions 18 in which refreshments, such as food and beverages, are sold or can be sold. For example, in the illustrated embodiment, each region 18 may include an external power source 20, such as a wall outlet, which can be used to provide power to a mobile refreshment cart 22. In accordance with present embodiments, the mobile refreshment cart 22 may be configured to cool the refreshments via thermoelectric cooling. That is, the mobile refreshment cart 22 may include one or more thermoelectric coolers which receive a power input, for example from an inverter of the mobile refreshment cart 22 which converts an alternating current from the external power source 20 to a direct current, thereby initiating a Peltier effect. The Peltier effect causes the thermoelectric cooler to extract heat from a refreshment chamber, or more specifically a thermally conductive plate partially defining the refreshment chamber, of the mobile refreshment cart 22.

Figure 2:
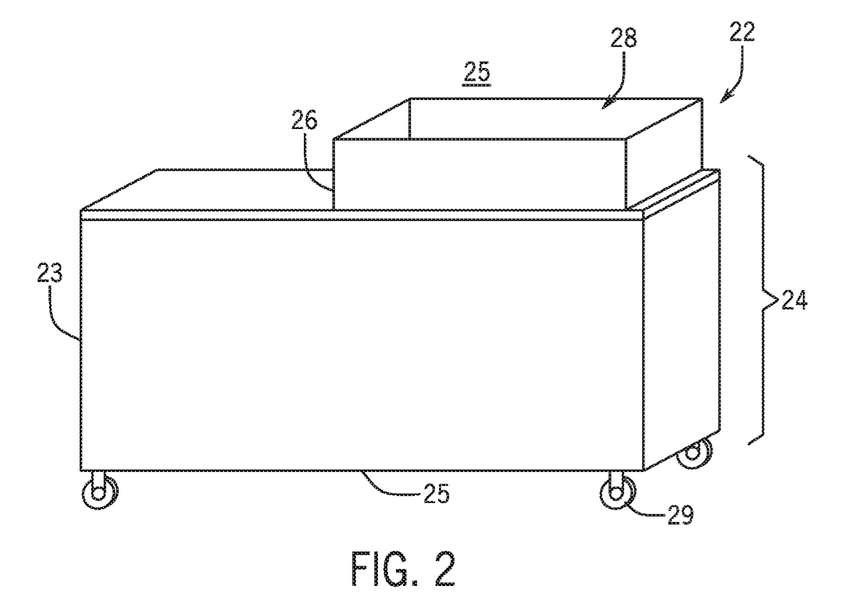
FIG. 2 is a front perspective view of an embodiment of the mobile refreshment cart of FIG. 1, in accordance with the present disclosure.
Figure 3:
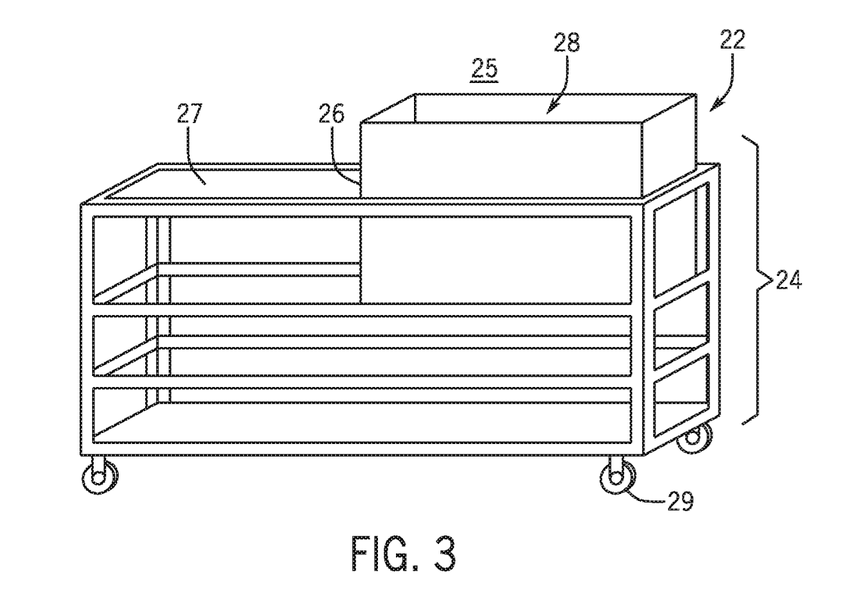
FIG. 3 is a front perspective view of an embodiment of the mobile refreshment cart of FIG. 1, in accordance with the present disclosure.

FIGS. 2 and 3 are front perspective views of an embodiment of the mobile refreshment cart 22 of FIG. 1, illustrating the structure and mobility features of the mobile refreshment cart 22. A skirt 23 is illustrated in FIG. 2, whereas the skirt 23 is removed in FIG. 3 to illustrate a frame 24 of the mobile beverage cart 22. The skirt 23 may hide aesthetically undesirable operating components of the mobile refreshment cart 22 from view. In FIGS. 2 and 3, the mobile beverage cart 22 includes a cooling container 26 having an open or exposed top 28. That is, the top 28 of the cooling container 26 is uncovered and exposed to environment 25. The mobile refreshment cart 22 also includes wheels 29 in the illustrated embodiment, which facilitates movement of the mobile refreshment cart 22 between various attractions, such as the attractions 12 illustrated in FIG. 1.

Focusing in particular on FIG. 3, the cooling container 26 may extend above and below a wall 27 of the frame 24 of the mobile refreshment cart 22. In some embodiments, the wall 27 of the mobile refreshment cart 22 may extend into the cooling container 26 to divide the cooling container 26 into an upper and lower section. In other embodiments, the cooling container 26 may include a wall separate from the illustrated wall 27, which divides the cooling container 26 into an upper and lower section. In either such embodiment, the wall dividing the cooling container 26 into two sections, for example the upper and lower section, may be referred to as a "container dividing wall." The container dividing wall and the upper and lower sections of the cooling container 26 will be described in detail with reference to later drawings, although it should be appreciated that certain embodiments may employ the disclosed cooling components and techniques without utilizing a container dividing wall to divide the cooling container 26 into the above-described sections. Embodiments described below with reference to later drawings include the container dividing wall and are intended as non-limiting examples of the presently disclosed mobile refreshment cart 22.

Cooling components of the disclosed mobile refreshment cart 22 will be described in detail with reference to FIGS. 5-9. First, thermoelectric cooling is described with respect to an embodiment of a thermoelectric circuit 30, which may be employed in presently disclosed thermoelectric coolers, schematically illustrated in FIG. 4. For example, the thermoelectric circuit 30 of FIG. 4 includes a ceramic layer 32 contacting a substrate 34 (e.g., a thermally conductive plate which is cooled by the thermoelectric circuit 30). The thermoelectric circuit 30 also includes an additional ceramic layer 35 on an opposing end of the thermoelectric circuit 30. Semiconductor elements, such as a p-type semiconductor element 38 and an n-type semiconductor element 40, may be positioned between the ceramic layer 32 and the additional ceramic layer 35. However, a conductive layer 42 is disposed between, and contacts, the ceramic layer 32 and the semiconductor elements 38, 40. That is, the conductive layer 42 separates the ceramic layer 32 from the semiconductor elements 38, 40. Similarly, additional conductive layers 44 and 46 are respectively disposed between the additional ceramic layer 35 and the semiconductor elements 38, 40. That is, a first additional conductive layer 44 separates the p-type semiconductor element 38 from the additional ceramic layer 35, and a second additional conductive layer 46 separates the n-type semiconductor element 40 from the additional ceramic layer 35. The additional conductive layers 44, 46 may be separate from each other, as shown.

Figure 4:
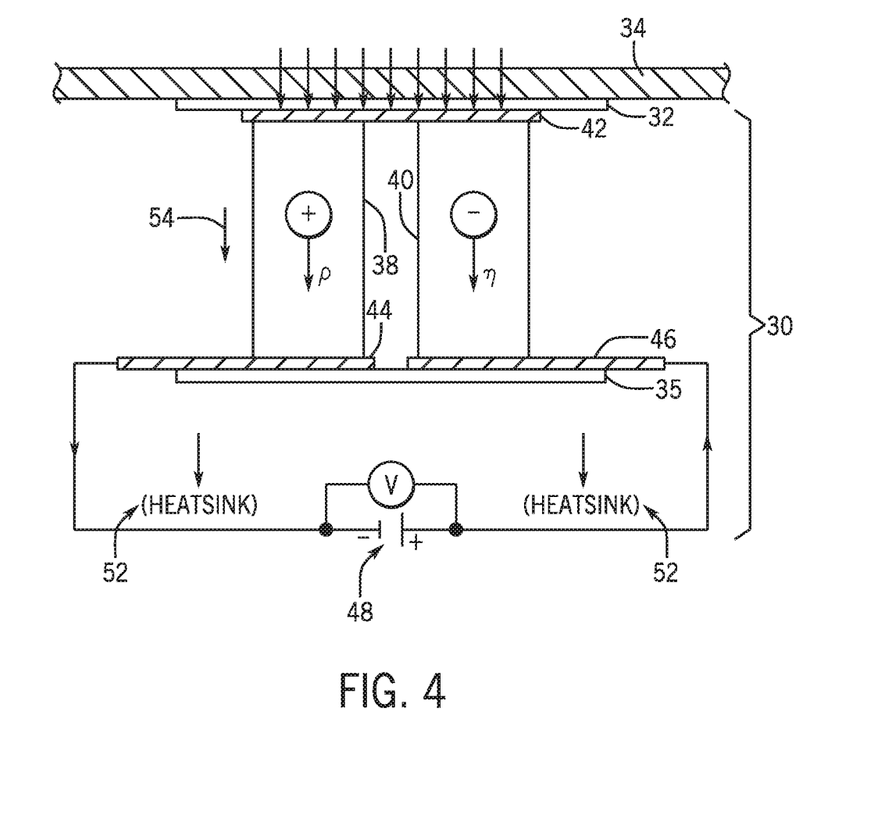
FIG. 4 is schematic diagram of an embodiment of a thermoelectric circuit that may be employed in a thermoelectric cooler utilized in the mobile refreshment cart of FIG. 1, in accordance with the present disclosure.

When a direct current is applied from a direct current (DC) power source 48 (e.g., an inverter which converts alternating current from a wall outlet to direct current) as shown, the direct current causes electron carriers to move heat from the conductive layer 42 to the additional conductive layers 44, 46, as illustrated by arrow 54, by way of the Peltier effect. The additional conductive layers 44, 46 may be coupled to a heat sink 52 via the additional ceramic layer 35, which may serve to electrically isolate the heat sink 52 while enabling conductive heat transfer. The conductive layer 42 may be coupled to a substrate 34, such as a thermally conductive plate of a cooling assembly of the disclosed mobile refreshment cart, via the ceramic layer 32. That is, the ceramic layer 32 may serve to electrically isolate the substrate 34 while enabling conductive heat transfer.

Figure 5:
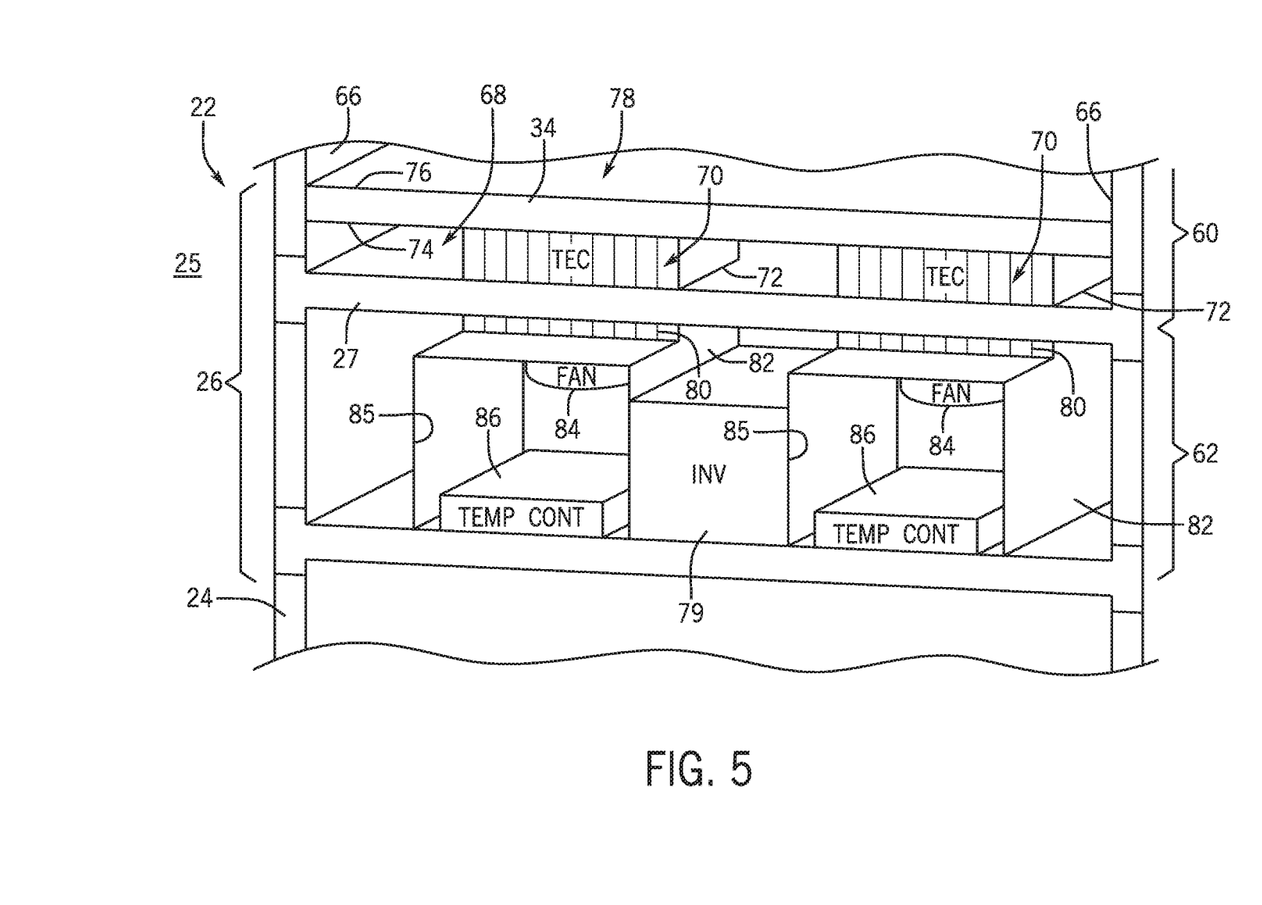
FIG. 5 is a back perspective view of an embodiment of a portion the mobile refreshment cart of FIG. 1, in accordance with the present disclosure.

With the description above in mind, FIG. 5 is a back perspective view of an embodiment of a portion the mobile refreshment cart 22 of FIG. 1. The illustrated mobile refreshment cart 22 includes the aforementioned cooling container 26. As previously described, the cooling container 26 may be integrated in part, or in whole, with the frame 24 of the mobile refreshment cart 22. That is, certain panels, walls, or frames of the cooling container 26 may be integral with certain panels, walls, or frames of a structural body of the mobile refreshment cart 22. The cooling container 26 and components housed in the cooling container 26 and configured to facilitate the cooling features described below may be collectively referred to as a "cooling assembly," in accordance with the present disclosure.

In the illustrated embodiment, the cooling container 26 includes the container dividing wall 27, which divides the cooling container 26 into a first section, referred to herein as an upper section 60, and a second section, referred to herein as a lower section 62. In some embodiments, the container dividing wall 27 and/or the cooling container 26 is actuatable, for example with respect to each other, such that sizes of the upper section 60 and lower section 62 are adjustable. The upper section 60 in FIG. 5 is exposed for purposes of illustrating components disposed therein; however, the illustrated side of the upper section 60 may be covered by a panel of the cooling container 26 in operation.

The lower section 62 of the cooling container 26 may be wholly or partially exposed to enable an air flow through components disposed in the lower section 62. In other words, while the illustrated face of the upper section 60 of the cooling container 26 may be closed in operation, the lower section 62 may be exposed in operation. The upper section 60 may include, for example, the aforementioned thermally conductive plate 34 disposed therein. The thermally conductive plate 34 may be coupled to one or more panels 66 of the cooling container 26. As shown, the thermally conductive plate 34 may be separated from the container dividing wall 27 by an air gap 68, which thermally decouples the container dividing wall 27 from the thermally conductive plate 34. As previously described, the container dividing wall 27 may be integrally formed, or a part of, the frame 24 of the mobile refreshment cart 22, or the container dividing wall 27 may be separate from the frame 24 of the mobile refreshment cart 22 and coupled thereto.

The illustrated embodiment includes two thermoelectric coolers 70, although other embodiments may include only one thermoelectric cooler or more than two thermoelectric coolers. While the thermoelectric coolers 70 are shown schematically in the illustrated embodiment (e.g., fins or a heat sink of the thermoelectric cooler 70 is shown), FIG. 4 and the corresponding description provides context regarding the components of a thermoelectric circuit 30 (e.g., the ceramic layer 32, the additional ceramic layer 35, the conductive layer 42, the additional conductive layers 44, 46, and the semiconductor elements 38, 40) utilized in the illustrated thermoelectric cooler 70. That is, the components of the thermoelectric circuit 30 illustrated in FIG. 4 may be disposed, for example, behind the fins 80 illustrated in FIG. 5, which act as heat sinks for the thermoelectric coolers 70.

Each thermoelectric cooler 70, as shown, may traverse between the upper section 60 and the lower section 62 of the cooling container 26, for example by way of openings 72 in the container dividing wall 27. Thus, the thermoelectric coolers 70 extend into the air gap 68 of the upper section 60 of the cooling container 26. The thermoelectric coolers 70 also directly contact a lower surface 74 of the thermally conductive plate. As a direct current is applied to the thermoelectric coolers 70, for example via an inverter 79 coupled to an external power source such as a wall outlet, the thermoelectric coolers 70 extract heat through the lower surface 74 of the thermally conductive plate 34, causing an upper surface 76 of the thermally conductive plate 34 to be cooled. A refreshment chamber 78 is disposed within the upper section 60 of the cooling container 26 and above the upper surface 76 of the thermally conductive plate 34. Thus, heat is extracted from the refreshment chamber 78, through the thermally conductive plate 34, and toward a heat sink 80 (e.g., fins) of the thermoelectric coolers 70.

Figure 6:
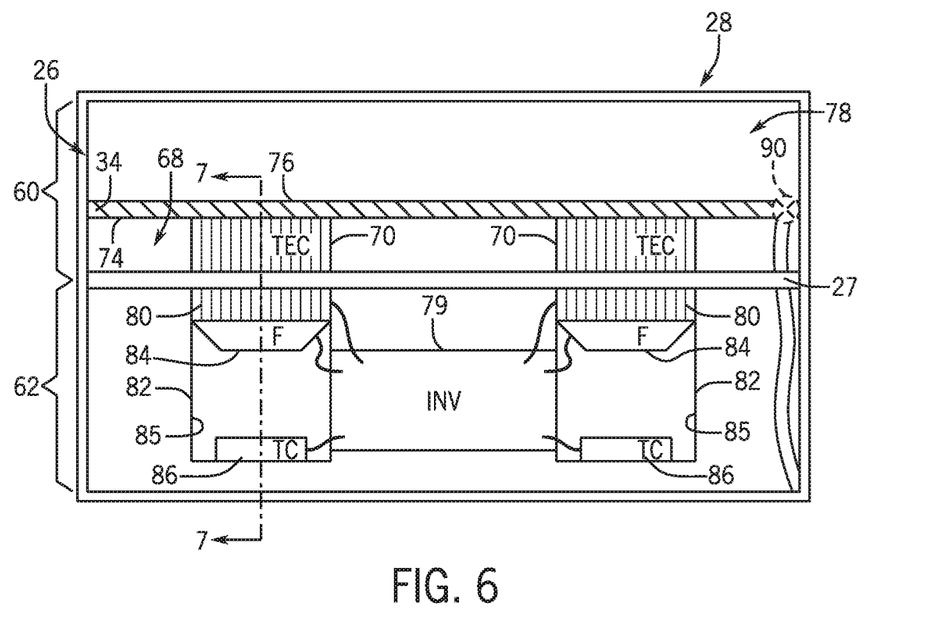
FIG. 6 is a back elevational view of an embodiment of a portion of the mobile refreshment cart of FIG. 1, in accordance with the present disclosure.

In addition to the above-described conductive heat transfer, the heat stored in the heat sinks 80 of the thermoelectric coolers 70 may be conveyed to the surrounding environment 25. For example, in the illustrated embodiment, Venturi boxes 82, such as L-shaped Venturi boxes 82, may be employed to facilitate conveyance of the heat to the surrounding environment 25. Each Venturi box 82 may house the aforementioned thermoelectric cooler 70, a fan 84, and a temperature controller, such as a thermostat 86. The fan 84 may be configured to draw an air flow through an inlet 85 of the Venturi box 82, and to urge the air flow through at least a portion of the heat sink 80. For example, FIG. 6 is a back view of an embodiment of a portion of the mobile refreshment cart 22 of FIG. 1, illustrating the Venturi boxes 82 each having the thermoelectric cooler 70, the fan 84, and the thermostat 86 disposed therein. As illustrated in FIG. 6, the fan 84, the thermostat 86, and/or the inverter 79 may operate as a feedback loop which seeks to control a temperature of the refreshment chamber 78 and/or corresponding components, and to ensure desirable operation of the thermoelectric coolers 70. Indeed, it may be beneficial to cool the refreshment chamber 78 to a particular temperature suitable for cooling beverages, and/or to cool the heat sinks 80 of the thermoelectric coolers 70 in order to reduce an amount of power required to maintain a target temperature of the refreshment chamber 78.

In FIG. 6, each Venturi box 82 includes the thermoelectric cooler 70, the corresponding heat sink 80, the fan 84, and the thermostat 86. The inverter 79, which is disposed within a gap between the two thermoelectric coolers 70 in the illustrated embodiment, may be electrically or electronically coupled with the fan 84, the thermostat 86, and the thermoelectric cooler 70 of each Venturi box 82. The thermostat 86 may monitor a temperature of one or more components or areas of the cooling container 26. For example, the thermostat 86 may include a sensor configured to monitor a temperature of the corresponding heat sink 80, which may be indicative of a temperature of other portions of the cooling container 26, such as the refreshment chamber 78 having an open or exposed top 28. However, the sensor of the thermostat 86, or a sensor communicatively coupled with the thermostat, may sample the temperature of a component or space other than the heat sink 80. Based on the temperature monitored by the thermostat 86, a power input to the fan 84 (e.g., for changing a speed or torque of the fan) and/or to the thermoelectric cooler 70 (e.g., for changing a cooling effect of the thermoelectric cooler) may be modulated in order to achieve the target temperature. With the illustrated configuration, power input from a wall outlet may be suitable for generating a slab of ice on the upper surface 76 of the thermally conductive plate 34, where the upper surface 76 faces the refreshment chamber 78. That is, the reduced temperature in the refreshment chamber 78 may condense a fluid (e.g., water) from the air within the exposed refreshment chamber 78, causing the slab of ice on the upper surface 76 of the thermally conductive plate 34. After operation of the cooling container 26 or assembly, the ice may melt and may be drained from the refreshment chamber 78 via a drain 90.

Figure 7:
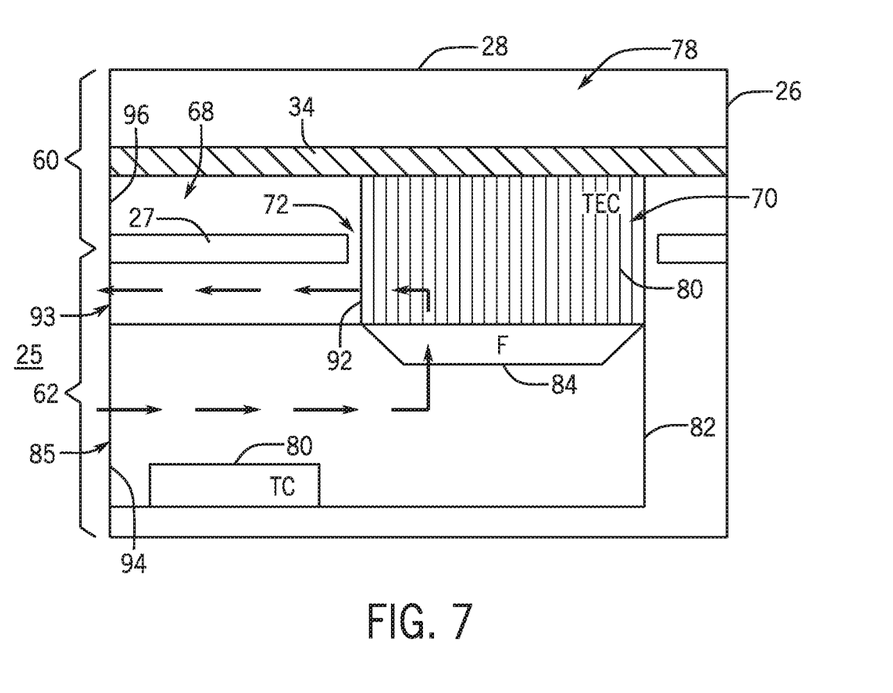
FIG. 7 is a cross-sectional side view of an embodiment of the portion illustrated in FIG. 6 of the mobile refreshment cart of FIG. 1, taken along line 7-7 in FIG. 6, in accordance with the present disclosure.

FIG. 7 is a cross-sectional side view of an embodiment of the cooling container 26 of FIG. 6, taken along line 7-7 in FIG. 6. In the illustrated embodiment, only one thermoelectric cooler 70 and corresponding Venturi box 82 is shown, due to the selected cross-section. In the illustrated embodiment, the fan 84 draws an air flow through the inlet 85 of the Venturi box 82, and passes the air flow over the heat sink 80 (e.g., fins) of the thermoelectric cooler. The air flow may be forced through an outlet 92 of the Venturi box 82 toward the exposed back end 94 of the lower section 62 of the cooling container 26 (e.g., via outlet 93). As previously described, the air gap 68 between the container dividing wall 27 and the thermally conductive plate 34 may be enclosed by a back panel 96 of the cooling container 26, whereas the back end 94 of the lower section 62 of the cooling container 26 is exposed to the environment 25 to enable the above-described air flow. As the air passes over the heat sink 80 and toward the environment 25, heat is carried away from the heat sink 80 and into the environment 25.

Figure 8:
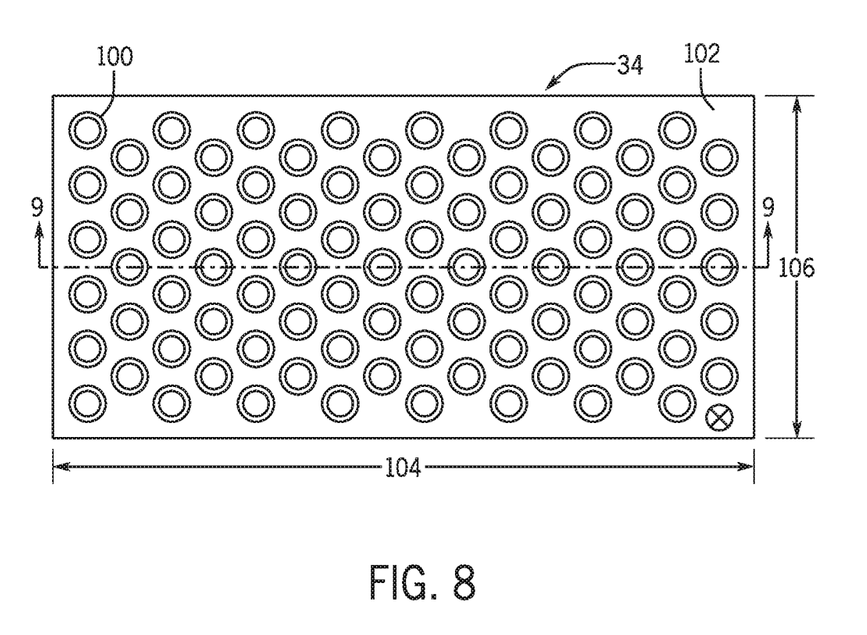
FIG. 8 is a schematic top-down view of an embodiment of a thermally conductive plate, for use in the mobile refreshment cart of FIG. 1, in accordance with the present disclosure.
Figure 9:
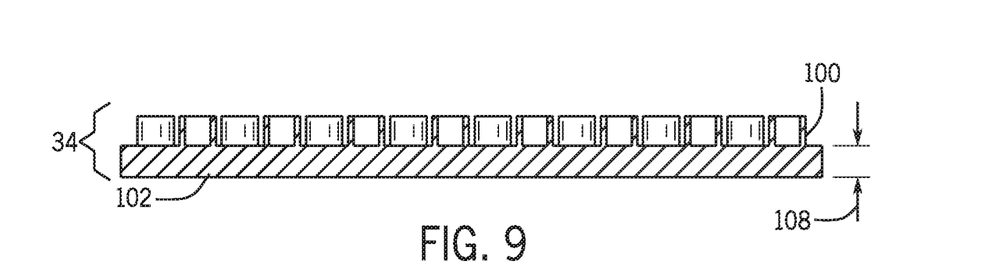
FIG. 9 is a cross-sectional view of an embodiment of the thermally conductive plate of FIG. 8, taken along line 9-9 in FIG. 8, in accordance with the present disclosure.

FIG. 8 is a schematic top-down view of an embodiment of the thermally conductive plate 34, for use in the mobile refreshment cart 22 of FIG. 1. FIG. 9 is a cross-sectional view of an embodiment of the thermally conductive plate 34 of FIG. 8, taken along line 9-9 in FIG. 8. While the thermally conductive plate 34 includes a substantially smooth, substantially continuous upper surface 76 in embodiments described with respect to FIGS. 4-7, the thermally conductive plate 34 in FIGS. 8 and 9 includes beverage receiving extensions 100. The beverage receiving extensions 100 may be cylindrical, for example, and may define receptacles configured to receive cylindrically-shaped beverage containers. Other shapes of the extensions 100 are also possible. The extensions 100 may include a thermally conductive component. In some embodiments, the extensions 100 may be integrally formed with a base 102 of the thermally conductive plate 34. The base 102 of the thermally conductive plate 34, regardless of whether it includes the illustrated extensions 100, may be sized to facilitate ideal conductive heat transfer in accordance with the above descriptions. As shown in FIG. 8, the base 102 of thermally conductive plate 34 may include, for example, a 27 inch length 104 and a 23 inch width 106, although other sizes may be employed. Further, as shown in FIG. 9, the base 102 (i.e., not including the extensions 100) of the thermally conductive plate 34 may include, for example, a 0.5 inch height 108 (or "thickness"). In other embodiments, the base 102 of the thermally conductive plate 34 may include a length 104 of approximately 20-35 inches, a width 106 of approximately 15-30 inches, and/or a height 108 of approximately 0.25-0.75 inches. Thus, in certain embodiments, a width 106:length 104:height 108 ratio may be approximately 15-30:20-35: 0.25-0.75.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A mobile refreshment cart, comprising:
a refreshment chamber configured to receive refreshment containers therein;
a thermally conductive plate having a first surface defining an interior of the refreshment chamber, a second surface opposite to the first surface, and a thickness of the thermally conductive plate from the first surface to the second surface;
a thermoelectric cooler coupled to, and directly contacting, the second surface of the thermally conductive plate, wherein the thermoelectric cooler is configured to extract heat from the refreshment chamber through the thermally conductive plate;
a fan configured to urge an air flow over a portion of the thermoelectric cooler and to an environment surrounding the mobile refreshment cart, such that the air flow extracts the heat from the portion of the thermoelectric cooler and expels the heat to the environment; and
a container in which the refreshment chamber, the thermally conductive plate, the thermoelectric cooler, and the fan are disposed, wherein the container comprises a container dividing wall disposed adjacent to the second surface of the thermally conductive plate, wherein the container dividing wall comprises an opening through which the thermoelectric cooler extends, and wherein the second surface of the thermally conductive plate and the container dividing wall are separated from each other by an air gap configured to block conductive thermal coupling between the thermally conductive plate and the container dividing wall.

2. The mobile refreshment cart of claim 1, wherein the portion of the thermoelectric cooler comprises fins disposed between the fan and the second surface of the thermally conductive plate.

3. The mobile refreshment cart of claim 1, comprising a box in which the portion of the thermoelectric cooler and the fan are disposed, wherein the box is configured to define a fluid passageway through which the fan urges the air flow over the portion of the thermoelectric cooler and to the environment.

4. The mobile refreshment cart of claim 1, comprising:
an additional thermoelectric cooler coupled to, and directly contacting, the second surface of the thermally conductive plate, wherein the additional thermoelectric cooler is configured to extract the heat from the refreshment chamber through the thermally conductive plate; and
an additional fan configured to urge an additional air flow over an additional portion of the additional thermoelectric cooler and to the environment, such that the additional air flow extracts the heat from the additional portion of the additional thermoelectric cooler and expels the heat to the environment.

5. The mobile refreshment cart of claim 4, wherein the thermoelectric cooler and the additional thermoelectric cooler are spaced from each other by a gap, wherein an inverter is disposed within the gap, and wherein the inverter is configured to receive an alternating current, to convert the alternating current to a direct current, and to provide the direct current to the thermoelectric cooler and the additional thermoelectric cooler.

6. The mobile refreshment cart of claim 5, comprising:
a thermostat configured to monitor a temperature of the thermoelectric cooler; and
an additional thermostat configured to monitor an additional temperature of the additional thermoelectric cooler.

7. The mobile refreshment cart of claim 6, wherein the inverter is configured to receive data feedback from the thermostat and the additional thermostat, and wherein the inverter is configured to modulate a power input to the thermoelectric cooler, the fan, the additional thermoelectric cooler, the additional fan, or any combination thereof based at least in part on the data feedback.

8. The mobile refreshment cart of claim 1, wherein the thermally conductive plate comprises extensions extending from the first surface and defining receptacles configured to receive individual refreshment containers therein.

9. The mobile refreshment cart of claim 1, wherein the thermally conductive plate comprises an aluminum alloy material, an approximate half inch height through the thickness from the first surface to the second surface, or both.

10. The mobile refreshment cart of claim 1, comprising a frame mounted on a wheel set configured to enable movement of the mobile refreshment cart.

11. A cooling assembly for a mobile refreshment cart, wherein the cooling assembly comprises:
a container divided, by a container dividing wall of the container, into an upper container section and a lower container section;
a thermally conductive plate disposed in the upper container section and separated from the container dividing wall by an air gap, wherein a first surface of the thermally conductive plate faces an interior of a refreshment chamber of the cooling assembly disposed in the upper container section and configured to receive refreshment containers, and wherein a second surface of the thermally conductive plate opposite to the first surface faces the air gap; and
a thermoelectric cooler traversing the lower container section and the upper container section by way of an opening in the container dividing wall, wherein the thermoelectric cooler directly contacts the second surface of the thermally conductive plate and is configured to extract heat from the thermally conductive plate through the second surface.

12. The cooling assembly of claim 11, comprising a fan configured to urge an air flow over a portion of the thermoelectric cooler and to an environment surrounding the cooling assembly, such that the air flow extracts the heat from the thermoelectric cooler and expels the heat to the environment.

13. The cooling assembly of claim 12, comprising:
a thermostat configured to monitor a temperature of the thermoelectric cooler; and
an inverter configured to provide a power input to the thermoelectric cooler to drive a thermoelectric effect, and to provide an additional power input to the fan, wherein the inverter is configured to receive data feedback from the thermostat, and the inverter is configured to modulate the power input to the thermoelectric cooler, the additional power input to the fan, or both based at least in part on the data feedback.

14. The cooling assembly of claim 12, wherein the portion of the thermoelectric cooler comprises fins disposed between the fan and the second surface of the thermally conductive plate.

15. The cooling assembly of claim 12, comprising a box in which the portion of the thermoelectric cooler and the fan are disposed, wherein the box is configured to define a fluid passageway through which the fan urges the air flow over the portion of the thermoelectric cooler and to the environment surrounding the cooling assembly.

16. The cooling assembly of claim 11, comprising an additional thermoelectric cooler traversing the lower container section and the upper container section by way of the opening or an additional opening in the container dividing wall, wherein the thermoelectric cooler directly contacts the second surface of the thermally conductive plate and is configured to extract the heat from the thermally conductive plate through the second surface.

17. The cooling assembly of claim 16, comprising:
a fan configured to urge an air flow over a portion of the thermoelectric cooler and to an environment surrounding the cooling assembly, such that the air flow extracts the heat from the thermoelectric cooler and expels the heat to the environment; and
an additional fan configured to urge an additional air flow over an additional portion of the additional thermoelectric cooler and to the environment surrounding the cooling assembly, such that the additional air flow extracts the heat from the additional thermoelectric cooler and expels the heat to the environment.

18. The cooling assembly of claim 11, wherein the upper container section comprises sidewalls defining the refreshment chamber, and wherein the upper container section comprises an open face configured to expose the refreshment chamber to an environment surrounding the cooling assembly.

19. A mobile refreshment cart, comprising:
a refreshment chamber configured to receive refreshment containers;
a thermally conductive plate having a first surface facing, and partially defining, an interior of the refreshment chamber, and a second surface disposed opposite to the first surface;
a thermoelectric cooler coupled to the second surface of the thermally conductive plate and configured to extract heat through the second surface of the thermally conductive plate;
a container dividing wall separated from the second surface of the thermally conductive plate by an air gap, the container dividing wall having an opening through which the thermoelectric cooler extends to enable the thermoelectric cooler to be coupled to the second surface of the thermally conductive plate; and
a fan configured to urge an air flow over a portion of the thermoelectric cooler and to an environment surrounding the mobile refreshment cart, such that the air flow extracts the heat from the portion of the thermoelectric cooler and expels the heat to the environment.

20. The mobile refreshment cart of claim 19, comprising a box in which the portion of the thermoelectric cooler and the fan are disposed, wherein the box is configured to define a fluid passageway through which the fan urges the air flow over the portion of the thermoelectric cooler and to the environment surrounding the mobile refreshment cart.

21. The mobile refreshment cart of claim 19, comprising:
an additional thermoelectric cooler coupled to the second surface of the thermally conductive plate and configured to extract the heat through the second surface of the thermally conductive plate; and
an additional fan configured to urge an additional air flow over an additional portion of the additional thermoelectric cooler and to the environment surrounding the mobile refreshment cart, such that the additional air flow extracts the heat from the thermoelectric cooler and expels the heat to the environment.

22. The mobile refreshment cart of claim 1, comprising:
a panel extending from the thermally conductive plate to the container dividing wall such that the air gap between the thermally conductive plate and the container dividing wall is enclosed from the environment.

* * * * *